(12) United States Patent   (10) Patent No.: US 12,649,666 B2
Wei et al.   (45) Date of Patent: Jun. 9, 2026

(54) PROCESS FOR PREPARING ZEOLITE MATERIAL HAVING AN AFX FRAMEWORK STRUCTURE AND ZEOLITE MATERIAL AS PREPARED

(71) Applicant: BASF CORPORATION, Florham Park, NJ (US)

(72) Inventors: Ming Ming Wei, Shanghai (CN); Shi Lihua, Dalian (CN); Vivek Vattipalli, Iselin, NJ (US); Li Menglu, Dalian (CN); Liu Haitao, Dalian (CN); Li Jin, Dalian (CN)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 168 days.

(21) Appl. No.: 18/044,607

(22) PCT Filed: Sep. 10, 2021

(86) PCT No.: PCT/US2021/049746

§ 371 (c)(1),
(2) Date: Mar. 9, 2023

(87) PCT Pub. No.: WO2022/056185

PCT Pub. Date: Mar. 17, 2022

(65) Prior Publication Data

US 2023/0312357 A1   Oct. 5, 2023

(30) Foreign Application Priority Data

Sep. 11, 2020   (WO) ................ PCT/CN2020/114793

(51) Int. Cl.
*C01B 39/48* (2006.01)
*B01D 53/94* (2006.01)

(52) U.S. Cl.
CPC .......... *C01B 39/48* (2013.01); *B01D 53/9418* (2013.01); *B01D 2255/50* (2013.01); *B01D 2257/40* (2013.01); *C01P 2004/32* (2013.01); *C01P 2004/45* (2013.01)

(58) Field of Classification Search
None
See application file for complete search history.

(56) References Cited

U.S. PATENT DOCUMENTS 5,194,235 A   3/1993   Zones
10,053,368 B1 *   8/2018   Xie ......................... B01J 29/70

2016/0137518 A1   5/2016   Rivas-Cardona et al.
2018/0093259 A1   4/2018   Chen et al.
2018/0093897 A1   4/2018   Chen et al.
2020/0156949 A1   5/2020   Berthout et al.

FOREIGN PATENT DOCUMENTS

| | | | | |
|---|---|---|---|---|
| JP | 2003515620 | * | 5/2003 | |
| JP | 6655959 B2 | | 3/2020 | |
| WO | WO-2017213762 A1 | * | 12/2017 | ......... B01D 53/8628 |
| WO | WO2018104913 | * | 6/2018 | |
| WO | WO-2018104913 A1 | * | 6/2018 | ............. B01J 29/50 |
| WO | WO-2019/048940 A1 | | 3/2019 | |
| WO | WO-2019/224085 A1 | | 11/2019 | |

OTHER PUBLICATIONS

International Search Report and Written Opinion for corresponding PCT/US2021/049746 mailed Dec. 23, 2021; 8 pages.
Boruntea et al., Crystallization of AEI and AFX zeolites through zeolite-to-zeolite transformations, Microporous and Mesoporous Materials, Apr. 1, 2019, Elsevier, Amsterdam , NL.
Deneyer et al., Zeolite Synthesis under Nonconventional Conditions: Reagents, Reactors, and Modi Operandi, Chemistry of materials, Jun. 23, 2020, American Chemical Society, US.
Yoshioka, et al., "Ultrafast and continuous-flow synthesis of AFX zeolite via interzeolite conversion of FAU zeolite", Reaction Chemistry & Engineering, vol. 6, Issue 1, Sep. 9, 2020, pp. 74-81.

* cited by examiner

*Primary Examiner* — Sheng H Davis

(74) *Attorney, Agent, or Firm* — DLA Piper LLP (US)

(57)   ABSTRACT

Disclosed herein is a process for preparing a zeolite material having an AFX framework structure including $X_2O_3$ and $YO_2$ via interzeolite conversion, the process including (1) providing a mixture including a first zeolite material having a non-FAU framework structure including $X_2O_3$ and $YO_2$ and an organic structure directing agent selected from the group consisting of diquaternary ammonium cation containing compounds, and (2) heating the mixture from (1) to form a second zeolite material having an AFX framework structure including $X_2O_3$ and $YO_2$, wherein X is a trivalent element and Y is a tetravalent element, and where the organic structure directing agent is not 1,4-bis(1,4-diazabicyclo[2.2.2]octane)butyl dihydroxide when the first material zeolite has a CHA framework structure. Further disclosed herein is the zeolite material having an AFX framework structure as obtainable or obtained from the process, and a method of using the same as a catalytically active material.

19 Claims, 5 Drawing Sheets

PROCESS FOR PREPARING ZEOLITE MATERIAL HAVING AN AFX FRAMEWORK STRUCTURE AND ZEOLITE MATERIAL AS PREPARED

CROSS-REFERENCE TO RELATED APPLICATIONS

This application is a U.S. National Phase Application of International Patent Application No. PCT/US2021/049746, filed Sep. 10, 2021, which claims priority to Chinese Patent Application No. PCT/CN2020/114793, filed Sep. 11, 2020, each of which is hereby incorporated by reference herein.

FIELD OF THE INVENTION

The present invention relates to a process for preparing a zeolite material having an AFX framework structure via interzeolite conversion in the presence of an organic structure directing agent. Further, the present invention relates to the zeolite material having an AFX framework structure as obtainable or obtained from the process, and to use of the same as a catalytically active material.

BACKGROUND

AFX zeolites as small-pore zeolites are known useful as catalyst in various processes, such as selective catalytic reduction (SCR) of NOx in combustion exhaust gases, hydrocarbon cracking and reforming, and conversion of methanol to olefins (MTO). Synthesis of AFX zeolite has attracted more and more attention in recent years. AFX zeolite are generally prepared by precipitating zeolite crystal from a synthesis mixture comprising a source for silica and a source for alumina. Alternatively, AFX zeolite may be prepared via interzeolite conversion from a zeolite of different framework type in the presence of a structure directing agent (SDA), as reported for example in following non-patent and patent documents.

Boruntea C. R. et al. in Microporous and Mesoporous Materials, 278 (2019), pages 105-114 describes synthesis of AFX zeolites through zeolite-to-zeolite transformations from FAU or CHA zeolites using 1,4-bis(1,4-diazabicyclo[2.2.2] octane)butyl dihydroxide as SDA.

US 2018/093259 A1 and US2016/0137518 A1 describe synthesis of an AFX zeolite from zeolite Y using 1,3-bis(1-adamantyl)imidazolium hydroxide or 2,6-N,N-diethyl-cis-2, 6-dimethyl-piperidinium hydroxide as SDA.

US2018/093897A1 describes synthesis of an AFX zeolite from zeolite Y using a multi-SDA system consisting of 1,3-bis(1-adamantyl)imidazolium hydroxide and at least one neutral amine.

WO 2019/048940 A1 describes synthesis of an AFX zeolite from zeolite Y using hexamethonium hydroxide as SDA.

WO 2019/224085 A1 describes synthesis of an AFX zeolite from at least two FAU zeolites using 1,5-bis(methylpiperidinium)pentane, 1,6-bis(methylpiperidinium) hexane, or 1,7-bis(methylpiperidinium)heptane as SDA.

JP 6655959 B2 describes synthesis of an AFX zeolite from zeolite Y using 1,4-diazabicyclo[2.2.2]octane-C4-diquat dibromide as SDA.

The processes for preparing the AFX zeolites as reported in those documents are limited to very particular starting zeolites and certain organic structure directing agents (OSDA). There remains a need of more processes for preparing zeolite materials having an AFX frame structure, particularly processes which could provide zeolite materials having an AFX frame structure with improved catalytic activities.

SUMMARY OF THE INVENTION

It was an object of the present invention to provide a novel process for preparing a zeolite material having an AFX framework structure, especially to a zeolite material having an AFX framework structure which is more effective for the selective catalytic reduction of NOx at high temperature.

It has surprisingly been found that the object can be achieved by a process for preparing a zeolite material having an AFX framework structure via interzeolite conversion from a zeolite having a non-FAU framework structure in the presence of an organic structure directing agent.

Accordingly, in one aspect, the present invention relates to a process for preparing a zeolite material having an AFX framework structure comprising $X_2O_3$ and $YO_2$ via interzeolite conversion, the process comprising (1) providing a mixture comprising a first zeolite material having a non-FAU framework structure comprising $X_2O_3$ and $YO_2$ and an organic structure directing agent selected from diquaternary ammonium cation containing compounds, and (2) heating the mixture from (1) to form a second zeolite material having an AFX framework structure comprising $X_2O_3$ and $YO_2$, wherein X is a trivalent element and Y is is a tetravalent element, and wherein the organic structure directing agent is not 1,4-bis(1,4-diazabicyclo[2.2.2]octane) butyl dihydroxide when the first material zeolite has a CHA framework structure.

In another aspect, the present invention relates to a zeolite material having an AFX framework structure as obtainable or obtained from the process according to the first aspect.

In still another aspect, the present invention relates to use of the zeolite material having an AFX framework structure as described herein as a catalyst and/or as a catalyst component, preferably as a catalyst and/or a catalyst component for the selective catalytic reduction (SCR) of nitrogen oxides NOx.

In a further aspect, the present invention relates to a catalytic article comprising a catalytic coating on a substrate, wherein the catalytic coating comprises the zeolite material having an AFX framework structure as described herein.

In a still further aspect, the present invention relates to an exhaust gas treatment system comprising an internal combustion engine and an exhaust gas conduit in fluid communication with the internal combustion engine, wherein catalytic article as described herein is present in the exhaust gas conduit.

DETAILED DESCRIPTION OF THE INVENTION

Figures 1A, 1B, 1C, 1D:
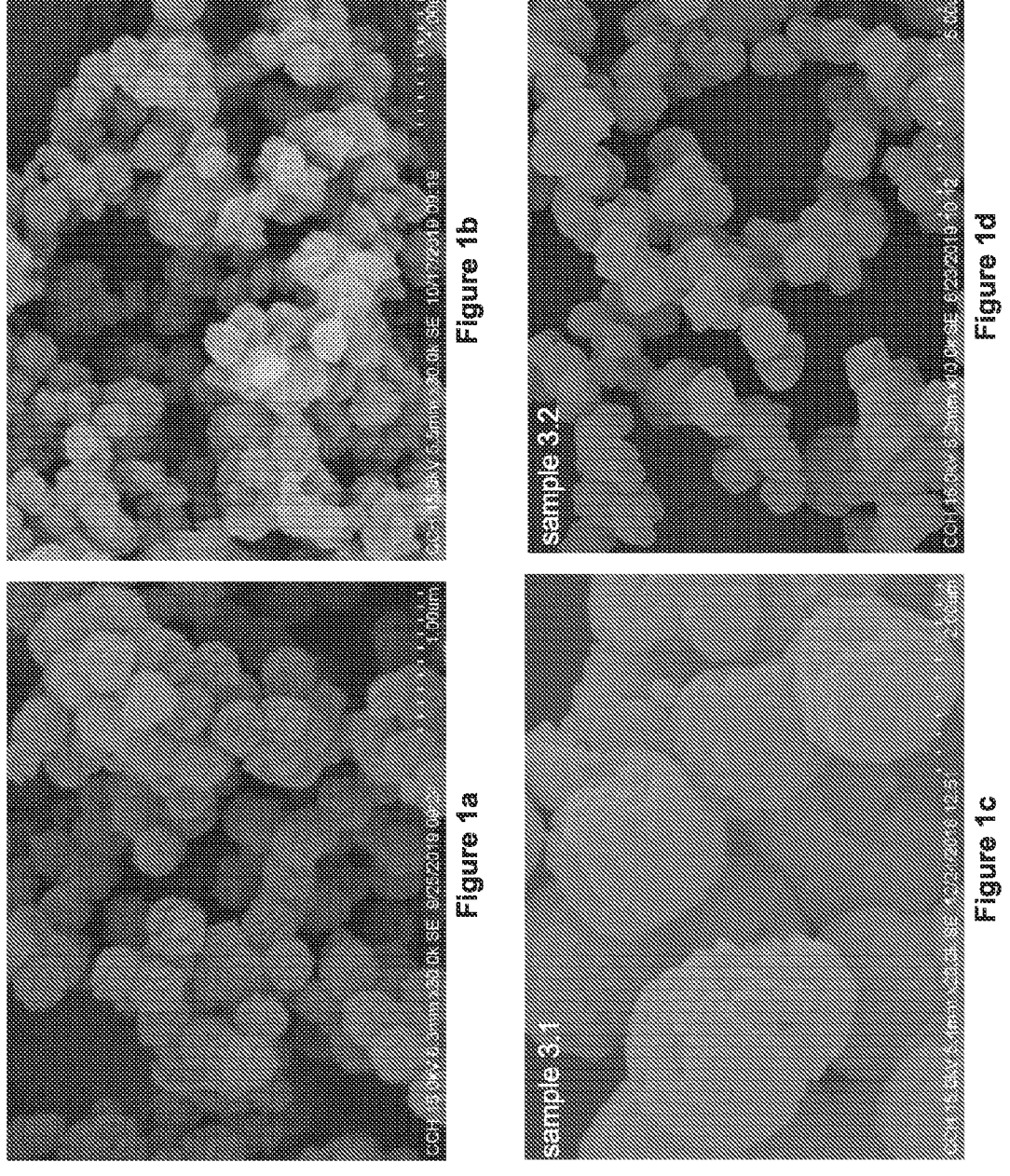
FIGS. 1a, 1b, 1c and 1d are SEM images of the AFX zeolite materials obtained from Example 1.1, Example 2.1, Example 3.1 and Example 3.2 respectively, showing the spheroidal aggregate morphology of the zeolites.

The present invention will be described in details hereinafter. It is to be understood that the present invention may be embodied in many different ways and shall not be construed as limited to the embodiments set forth herein.

Herein, the singular forms "a", "an" and "the" include plural referents unless the context clearly dictates otherwise. The terms "comprise", "comprising", etc. are used interchangeably with "contain", "containing", etc. and are to be interpreted in a non-limiting, open manner. That is, e.g., further components or elements may be present. The expressions "consists of" or "consists essentially of" or cognates may be embraced within "comprises" or cognates.

The terms "AFX", "FAU", "MFI" and "CHA" as used herein refer to AFX, FAU, MFI and CHA framework types respectively as recognized by the International Zeolite Association (IZA) Structure Commission.

The term "interzeolite conversion" as used herein has the same meaning as commonly understood by one of ordinary skill in the art of zeolite synthesis, which are generally used interchangeably with "zeolite to zeolite transformation" and "interzeolite transformation".

The term "zeolitic material having an AFX framework structure" as used herein is intended to include any forms of the zeolite having the specified framework, including for example as-synthesized form, $NH_4$-form, H-form and metal-loaded H-form. The term "having an AFX framework structure" refers to at least 90% phase pure AFX framework, i.e., at least 90% of the zeolite framework is type AFX.

In the context of the present invention, X may be any trivalent element. Preferably, X is selected from the group consisting of Al, B, In and Ga and any combinations thereof, wherein Al being more preferable. In the context of the present invention, Y may be any tetravalent element. Preferably, Y is selected from the group consisting of Si, Sn, Ti, Zr, Ge and any combinations thereof, wherein Si being more preferable.

As to step (1), there is no particular restriction to the first zeolite material having a non-FAU framework, which is however preferably a zeolite having a CHA framework structure, more preferably SSZ-13 zeolite, or preferably a zeolite having an MFI framework structure, more preferably ZSM-5 zeolite. The first zeolite having a non-FAU framework may be in respective $NH_4$-form, H-form or M-form wherein M represent alkali metal or alkaline earth metal.

In a particular embodiment, an aluminosilicate zeolite having non-FAU framework is useful as the first zeolite having non-FAU framework structure in step (1). Preferably, the aluminosilicate zeolite structure does not include phosphorus or other metals substituted in the framework, and excludes aluminophosphate materials such as SAPO, ALPO, and MeAPO materials.

It will be understood that the first zeolite material having a non-FAU framework comprised in the mixture provided in step (1) may act as the sources for $X_2O_3$ and $YO_2$ at the same time. In some embodiments, there is no additional source for $X_2O_3$ or $YO_2$ in the mixture provided in step (1). In some other embodiments, the mixture provided in step (1) may optionally comprise an additional source for $YO_2$. Suitable additional source for $YO_2$ may be any known materials useful for providing tetravalent framework element during zeolite synthesis. In a particular embodiment wherein Y is Si, suitable sources for $YO_2$ may be selected from the group consisting of fumed silica, precipitated silica, silica hydrosols, silica gels, colloidal silica, silicic acid, silicon alkoxides, alkali metal silicates such as sodium silicate and potassium silicate, sodium metasilicate hydrate, sesquisilicate, disilicate, silicic acid esters, other zeolites having non-FAU framework, dealuminated zeolites, and any combinations thereof.

Preferably, the mixture provided in step (1) has a $YO_2$:$X_2O_3$ molar ratio of the source(s) for $YO_2$ calculated as $YO_2$ to the source for $X_2O_3$ calculated as $X_2O_3$ in the range of from 5 to 60, preferably from 15 to 40, more preferably from 20 to 35, more preferably from 26 to 32.

The organic structure directing agent may be any diquaternary ammonium cation (Q) containing compounds with no particular restriction. Preferably, the organic structure directing agent is selected from the compounds containing a diquaternary ammonium cation of formula (I)

$$(R_1R_2R_3)N^+(CH_2)_nN^+(R_4R_5R_6) \tag{I}$$

in which $R_1, R_2, R_3, R_4, R_5$ and $R_6$, independently from each other, are selected from $C_1$-$C_{10}$ alkyl, and n is an integer of 3 to 10, or in which one of $R_1, R_2$ and $R_3$ is selected from $C_1$-$C_{10}$ alkyl and the other two are linked together to form a $C_4$-$C_6$ alkylene, one of $R_4, R_5$ and $R_6$ is selected from $C_1$-$C_{10}$ alkyl and the other two are linked together to form a $C_4$-$C_6$ alkylene, and n is an integer of 3 to 10.

In a preferable embodiment, the organic structure directing agent is selected from the compounds containing a diquaternary ammonium cation of formula (I), in which $R_1$, $R_2, R_3, R_4, R_5$ and $R_6$, independently from each other, are selected from $C_1$-$C_6$ alkyl, and n is an integer of 4 to 7.

In a more preferable embodiment, the organic structure directing agent is selected from the compounds containing a diquaternary ammonium cation of formula (I), in which $R_1$, $R_2, R_3, R_4, R_5$ and $R_6$ are the same and selected from $C_1$-$C_6$ alkyl, and n is 5, 6 or 7.

In the most preferable embodiment, the organic structure directing agent is selected from the compounds containing a diquaternary ammonium cation of formula (I), in which each of $R_1, R_2, R_3, R_4, R_5$ and $R_6$ is methyl, ethyl or propyl, preferably ethyl, and n is 5, 6 or 7.

In a particular embodiment, the organic structure directing agent is N,N,N,N',N',N'-hexaethyl-1,5-pentanediammonium (Et6-diquat-5), i.e., the compound containing a diquaternary ammonium cation of formula (I) in which each of $R_1, R_2, R_3, R_4, R_5$ and $R_6$ is ethyl and n is 5.

The diquaternary ammonium cation containing compounds may be in form of salts wherein the anions are selected from the group consisting of halide such as fluoride, chloride and bromide, hydroxide, sulfate, nitrate, carboxylate such as acetate, and any combinations thereof; preferably selected from the group consisting of chloride, bromide, hydroxide, sulfate, and any combinations thereof.

More preferably, the diquaternary ammonium cation containing compounds are hydroxides, chlorides or bromides, and particularly hydroxides of the diquaternary ammonium cation of formula (I) as described herein above.

Preferably, the mixture provided in step (1) has a $Q:YO_2$ molar ratio of the diquaternary ammonium cation (Q) to the source(s) for $YO_2$ calculated as $YO_2$ in the range of from 0.01 to 1, preferably from 0.02 to 0.5, more preferably from 0.02 to 0.2, more preferably from 0.05 to 0.15.

In some embodiments, the mixture provided in step (1) further comprises at least one solvent, preferably water, more preferably deionized water. Preferably, the mixture provided in step (1) has a molar ratio $H_2O:YO_2$ of water to the source(s) for $YO_2$ calculated as $YO_2$ in the range of from 3 to 60, preferably from 10 to 35, more preferably from 15 to 30.

In some embodiments, the mixture provided in step (1) further comprises at least one source for alkali metal and/or alkaline earth metal (AM) cation, preferably alkali metal cation. The alkali metal is preferably selected from the group consisting of Li, Na, K, Cs and any combinations thereof, more preferably Na and/or K, and most preferably Na. The alkaline earth metal is preferably selected from the group consisting of Mg, Ca, Sr and Ba. The sources for alkali metal or alkaline earth metal (AM) cation are typically salts of the alkali metal or alkaline earth metal with any anion that is not detrimental to the interzeolite conversion. Examples of useful anions may include halide such as fluoride, chloride and bromide, hydroxide, sulfate, nitrate, carboxylate such as acetate, and any combinations thereof; preferably chloride, bromide, hydroxide, sulfate and any combinations thereof, more preferably hydroxide.

The mixture provided in step (1) has an $AM:YO_2$ molar ratio of the at least one alkali metal and/or alkaline earth metal to the source(s) for $YO_2$ calculated as $YO_2$ in the range of from 0.01 to 1.0, preferably from 0.1 to 0.8.

In some preferable embodiments, the mixture provided in step (1) comprises at least one source for alkali metal and has an $AM:YO_2$ molar ratio of the at least one alkali metal to the source(s) for $YO_2$ calculated as $YO_2$ in the range of from 0.01 to 1.0, preferably from 0.1 to 0.8, more preferably from 0.3 to 0.8, more preferably from 0.4 to 0.7, particularly from 0.5 to 0.65. More preferably, the ratio $AM:YO_2$ of the at least one alkali metal to the source(s) for $YO_2$ calculated as $YO_2$ is in the range of 0.51 to 0.65 for the embodiments in which the first zeolite material is a zeolite having an MEI framework structure, particularly ZSM-5; and the ratio $AM:YO_2$ of the at least one alkali metal to the source(s) for $YO_2$ calculated as $YO_2$ is in the range of 0.56 to 0.64 for the embodiments in which the first zeolite material is a zeolite having a CHA framework structure.

In some embodiments, the mixture provided in step (1) further comprises at least one source for $OH^-$, wherein the source for $OH^-$ is a metal hydroxide such as alkali metal hydroxide, or an ammonium hydroxide. Preferably, the $OH^-$ anion is originated from the source for alkali metal and/or alkaline earth metal cation and/or the organic structure directing agent.

The mixture provided in step (1) has an $OH^-:YO_2$ molar ratio of $OH^-$ to the source(s) for $YO_2$ calculated as $YO_2$ in the range of from 0.01 to 2, more preferably from 0.05 to 1.2, more preferably from 0.3 to 1.0, more preferably from 0.4 to 0.9, more preferably from 0.6 to 0.9.

In some embodiments, the mixture provided in step (1) may further comprise an amount of seed crystals of a zeolite having an AFX framework structure. The seed crystals may be commercially available, or prepared by the process according to the present invention or any other process known in the art.

As to step (2), the mixture is preferably heated at a temperature in the range of from 80 to 250° C., more preferably from 90 to 230° C., more preferably from 100 to 200° C., more preferably from 110 to 190° C., more preferably from 120 to 180° C., more preferably from 130 to 170° C., most preferably from 135 to 155° C. The heating may be performed for a period in the range of from 0.25 to 12 days, more preferably from 0.5 to 10 days, more preferably from 1 to 7 days, more preferably from 2 to 6 days, more preferably from 2.5 to 5 days. Preferably, the heating is performed under autogenous pressure, more particularly in a pressure tight vessel, more preferably in an autoclave. Further, the heating is preferably performed under agitation.

In a particular embodiment, the heating in step (2) is performed at a temperature in the range of from 130 to 170° C., more preferably from 135 to 155° C., for a period in the range of from 1 to 7 days, preferably 2 to 6 days, more preferably from 2.5 to 5 days, under autogenous pressure in a pressure tight vessel, more preferably in an autoclave.

Generally, the second zeolite material having an AFX framework structure formed in step (2) may be subjected to a work-up procedure including isolating for example by filtration, optionally washing, and drying. Accordingly, step (2) in the process according to the present invention optionally further comprises the work-up procedure.

In some embodiments, the second zeolite material having an AFX framework structure from step (2) may be subjected to a calcination procedure. Accordingly, the process according to the present invention further comprises (3) calcining the second zeolite material having an AFX framework structure.

In some embodiments, the second zeolite material having an AFX framework structure may be subjected to an ion-exchange procedure such that one or more of ionic non-framework elements contained in the zeolite material is exchanged to $H^+$ and/or $NH_4^+$. Accordingly, the process according to the present invention further comprises (4) exchanging one or more of ionic non framework elements contained in the zeolite material obtained in step (2) or (3) to $H^+$ and/or $NH_4^+$, preferably $NH_4^+$.

Generally, the zeolite material having been exchanged to $H^+$ and/or $NH_4^+$ in step (4) may be subjected to a work-up procedure including isolating for example by filtration, optionally washing, and drying, and/or subjected to a calcination procedure. Accordingly, step (4) in the process according to the present invention optionally further comprises the work-up procedure and/or calcination procedure.

In some embodiments, the zeolite material having an AFX framework structure may be subjected to loading a promoter metal cation on and/or in the zeolite material. Accordingly, the process according to the present invention further comprises (5) loading a promoter metal cation on and/or in the zeolite material obtained in step (3) or (4), preferably by ion-exchanging or impregnation, more preferably incipient wetness impregnation.

The promoter metal may be any metals known useful for improving the catalytic activity of zeolites in catalyst applications, including for example precious metals such as platinum group metal, Au and Ag, transition metals and alkali earth metals. Preferably, the promoter metal is selected from the group consisting of Ca, Mg, Sr, Zr, Cr, Mo, Fe, Mn, V, Co, Ni, Cu, Zn, Ru, Rh, Pd, Ag, Os, Ir, Pt, Au and any combinations thereof, preferably from the group consisting of Ca, Mg, Sr, Cr, Mo, Fe, Mn, V, Co, Ni, Cu, Zn and any combinations thereof, more preferably from the group consisting of Ca, Mn, Fe, Mn, Ni, Cu, Zn and any combinations thereof, wherein Cu and/or Fe are most preferable.

The promoter metal may be loaded on and/or in the zeolite material in an amount of 0.1 to 1.0 moles, preferably 0.15 to 0.8 moles, more preferably 0.2 to 0.75 moles, per mole of aluminum in the zeolite material, namely the framework aluminum of the zeolite material having an AFX framework structure.

Generally, the zeolite material having been loaded with a promoter metal in step (5) may be subjected to a work-up procedure including isolating, optionally washing and drying, and/or to a calcination procedure. Accordingly, step (5) in the process according to the present invention optionally further comprises the work-up procedure and/or calcination procedure.

Regarding the calcination which is performed in step (3) and optionally performed in step (4) and (5), heating is performed at a temperature in the range of from 300 to 900° C., preferably from 350 to 700° C., more preferably from 400 to 650° C., and more preferably from 450 to 600° C. Particularly, the calcination may be performed in a gas atmosphere having a temperature in the above described ranges, which may be air, oxygen, nitrogen, or a mixture of two or more thereof. Preferably, the calcination is performed for a period in the range of from 0.5 to 10 h, preferably from 3 to 7 h, more preferably from 4 to 6 h.

The present invention further relates to the zeolite material having an AFX framework structure as obtainable or obtained from the process as described herein above. It will be understood that the zeolite material having an AFX framework structure may be the product obtainable or obtained directly from step (3), step (4) or step (5), depending on the steps actually performed in the process as described herein above.

The zeolite material having an AFX framework structure according to the present invention preferably has a $YO_2$: $X_2O_3$ molar ratio in the range of from 5 to 50, preferably from 5 to 35, more preferably from 5 to 20, more preferably from 5 to 15 as determined in its calcined H-form. The zeolite material having an AFX framework structure may be present in form of spheroidal aggregate particles.

The zeolite material having an AFX framework structure according to the present invention may be used for any conceivable purpose, including, but not limited to, as molecular sieve, as adsorbent, for ion-exchange, or as a catalyst and/or as a catalyst component, preferably as a catalyst for the selective catalytic reduction (SCR) of nitrogen oxides NOx; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins.

In some embodiments, the zeolite material having an AFX framework structure according to the present invention is used for the selective catalytic reduction (SCR) of nitrogen oxides NOx, and more preferably for the selective catalytic reduction (SCR) of nitrogen oxides NOx in exhaust gas from a combustion engine. Particularly, the zeolite material having an AFX framework structure according to the present invention has a SCR efficiency of at least 10%, preferably at least 20%, more preferably at least 30%, more preferably at least 40%, more preferably at least 50%, more preferably at least 60%, more preferably at least 70% higher than the SCR efficiency of a zeolite material prepared via interzeolite conversion from a zeolite having an FAU framework structure with the same organic structure directing agent, as determined by NOx conversion in a gas stream comprising 500 ppm NO, 500 ppm $NH_3$, 5% $H_2O$, 10% $O_2$ and balance of $N_2$, with gas hourly space velocity (GHSV) 80,000 $h^{-1}$ at 575° C.

For the SCR application, the zeolite material having an AFX framework structure according to the present invention may be in form of an extruded body or preferably as a washcoat on a substrate. The term "washcoat" has its usual meaning in the art, that is a thin, adherent coating of a catalytic or other material applied to a substrate. The term "substrate" generally refers to a monolithic material onto which a catalytic coating is disposed, for example monolithic honeycomb substrate, particularly flow-through monolithic substrate and wall-flow monolithic substrate. The zeolite material having an AFX framework structure according to the present invention may be processed into the application form by any known processes with no particular restriction.

Accordingly, the present invention relates to a catalytic article comprising a catalytic coating on a substrate, wherein the catalytic coating comprises the zeolite material having an AFX framework structure according to the present invention.

In a further embodiment, the present invention relates to an exhaust gas treatment system comprising an internal combustion engine and an exhaust gas conduit in fluid communication with the internal combustion engine, wherein the catalytic article as described above is present in the exhaust gas conduit.

The invention will be further illustrated by following Examples, which set forth particularly advantageous embodiments. While the Examples are provided to illustrate the present invention, they are not intended to limit it.

EMBODIMENTS

The following embodiments serve to further illustrate the invention as disclosed herein, and are not to be construed as limiting thereof.

Embodiment 1

A process for preparing a zeolite material having an AFX framework structure comprising $X_2O_3$ and $YO_2$ via interzeolite conversion, the process comprising
(1) providing a mixture comprising a first zeolite material having a non-FAU framework structure comprising $X_2O_3$ and $YO_2$ and an organic structure directing agent selected from diquaternary ammonium cation containing compounds, and
(2) heating the mixture from (1) to form a second zeolite material having an AFX framework structure comprising $X_2O_3$ and $YO_2$,
wherein X is a trivalent element and Y is is a tetravalent element, and wherein the organic structure directing agent is not 1,4-bis(1,4-diazabicyclo[2.2.2]octane) butyl dihydroxide when the first material zeolite has a CHA framework structure.

Embodiment 2

The process according to Embodiment 1, wherein X is selected from the group consisting of Al, B, In and Ga and any combinations thereof, preferably X being Al.

Embodiment 3

The process according to Embodiment 1 or 2, wherein Y is selected from the group consisting of Si, Say, Ti, Zr, Ge and any combinations thereof, preferably Y being Si.

Embodiment 4

The process according to any of Embodiments 1 to 3, wherein the first zeolite material is a zeolite having a CHA framework structure or a zeolite having an MFI framework structure.

Embodiment 5

The process according to any of the preceding Embodiments, wherein the first zeolite material is an aluminosilicate zeolite, preferably an SSZ-13 zeolite or a ZSM-5 zeolite.

Embodiment 6

The process according to any of the preceding Embodiments, wherein the organic structure directing agent is selected from the compounds containing a diquaternary ammonium cation of formula (I)

$$(R_1R_2R_3)N^+(CH_2)_nN^+(R_4R_5R_6) \tag{I}$$

in which
$R_1$, $R_2$, $R_3$, $R_4$, $R_5$ and $R_6$, independently from each other, are selected from $C_1$-$C_{10}$ alkyl, and n is an integer of 3 to 10,
or
in which
one of $R_1$, $R_2$ and $R_3$ is selected from $C_1$-$C_{10}$ alkyl and the other two are linked together to form a $C_4$-$C_6$ alkylene,
one of $R_4$, $R_5$ and $R_6$ is selected from $C_1$-$C_{10}$ alkyl and the other two are linked together to form a $C_4$-$C_6$ alkylene, and
n is an integer of 3 to 10.

Embodiment 7

The process according to any of the preceding Embodiments, wherein the organic structure directing agent is selected from the compounds containing a diquaternary ammonium cation of formula (I), in which $R_1$, $R_2$, $R_3$, $R_4$, $R_5$ and $R_6$, independently from each other, are selected from $C_1$-$C_6$ alkyl, and n is an integer of 4 to 7.

Embodiment 8

The process according to any of the preceding Embodiments, wherein the organic structure directing agent is selected from the compounds containing a diquaternary ammonium cation of formula (I), in which $R_1$, $R_2$, $R_3$, $R_4$, $R_5$ and $R_6$ are the same and selected from $C_1$-$C_6$ alkyl, and n is 5, 6 or 7.

Embodiment 9

The process according to any of the preceding Embodiments, wherein the organic structure directing agent is selected from the compounds containing a diquaternary ammonium cation of formula (I), in which each of $R_1$, $R_2$, $R_3$, $R_4$, $R_5$ and $R_6$ is methyl, ethyl or propyl, preferably ethyl, and n is 5, 6 or 7.

Embodiment 10

The process according to any of the preceding Embodiments, wherein the organic structure directing agent is N,N,N,N',N',N'-hexaethyl-1,5-pentanediammonium.

Embodiment 11

The process according to any of the preceding Embodiments, wherein the mixture in step (1) further comprises at least one source for alkali metal and/or alkaline earth metal cation, preferably alkali metal cation, and more preferably has an molar ratio of the at least one alkali metal and/or alkaline earth metal to the source(s) for $YO_2$ calculated as $YO_2$ in the range of from 0.01 to 1.0, preferably from 0.1 to 0.8.

Embodiment 12

The process according to Embodiment 11, wherein the mixture provided in step (1) comprises at least one source for alkali metal and has an $AM{:}YO_2$ molar ratio of the at least one alkali metal to the source(s) for $YO_2$ calculated as $YO_2$ in the range of from 0.01 to 1.0, preferably from 0.1 to 0.8, more preferably from 0.3 to 0.8, more preferably from 0.4 to 0.7, particularly from 0.5 to 0.65.

Embodiment 13

The process according to Embodiment 12, wherein the first zeolite material is a zeolite having an MEI framework structure, and the $AM{:}YO_2$ molar ratio of the at least one alkali metal to the source(s) for $YO_2$ calculated as $YO_2$ is in the range of 0.51 to 0.65.

Embodiment 14

The process according to Embodiment 12, wherein the first zeolite material is zeolite having a CHA framework structure, and the $AM{:}YO_2$ molar ratio of the at least one alkali metal to the source(s) for $YO_2$ calculated as $YO_2$ is in the range of 0.56 to 0.64.

Embodiment 15

The process according to any of the preceding Embodiments, further comprising (3) calcining the second zeolite material having an AFX framework structure.

Embodiment 16

The process according to any of the preceding Embodiments, further comprising (4) exchanging one or more of ionic non-framework elements contained in the zeolite material obtained in step (2) or (3) to $H^+$ and/or $NH_4^+$, preferably $NH_4^+$.

Embodiment 17

The process according to any of the preceding Embodiments, further comprising (5) loading a promoter metal cation on and/or in the zeolite material obtained in step (3) or (4).

Embodiment 18

A zeolite material having an AFX framework structure as obtainable or obtained from the process according to any of the preceding Embodiments.

Embodiment 19

A zeolite material having an AFX framework structure according to Embodiment 18, which is present in form of spheroidal aggregate particles.

Embodiment 20

A zeolite material having an AFX framework structure according to Embodiment 18 or 19, which has a SCR efficiency of at least 10%, preferably at least 20%, more preferably at least 30%, more preferably at least 40%, more preferably at least 50%, more preferably at least 60%, more preferably at least 70% higher than the SCR efficiency of a zeolite material prepared via interzeolite conversion from a zeolite having an FAU framework structure with the same organic structure directing agent, as determined by NOx conversion in a gas stream comprising 500 ppm NO, 500 ppm $NH_3$, 5% $H_2O$, 10% $O_2$ and balance of $N_2$, with gas hourly space velocity (GHSV) 80,000 $h^{-1}$ at 575° C.

Embodiment 21

Use of the zeolite material having an AFX framework structure according to any of preceding Embodiments 18 to 20 as a catalyst and/or as a catalyst component, preferably as a catalyst and/or a catalyst component for the selective catalytic reduction (SCR) of nitrogen oxides NOx.

Embodiment 22

A catalytic article, which comprises a catalytic coating on a substrate, wherein the catalytic coating comprises the zeolite material having an AFX framework structure according to any of preceding Embodiments 18 to 20.

Embodiment 23

An exhaust gas treatment system, which comprises an internal combustion engine and an exhaust gas conduit in fluid communication with the internal combustion engine, wherein the catalytic article according to Embodiment 22 is present in the exhaust gas conduit.

Embodiment 24

A method for the selective catalytic reduction of NOx comprising
  (A) providing a gas stream comprising NOx;
  (B) contacting the gas stream with a zeolite material according to any of embodiments 18 to 20 or with a catalytic article according to embodiment 22.

EXAMPLES

Scanning electron microscopy (SEM) experiments were performed by a scanning electron microscope (Hitachi SU1510).

X-ray powder diffraction (XRD) patterns were measured with X-ray diffractometer (X'pert 3 Powder from Malvern Panalytical) (40 kV, 40 mA) using CuKα (λ=1.5406 Å) radiation.

Example 1

Preparation of AFX Zeolite using ZSM-5 Zeolite

Example 1.1 (Sample 1.1, Na/SiO$_2$ 0.56)

35.70 g of 18.03 wt % aqueous Et6-diquat-5 hydroxide solution was mixed with 59.24 g DI water, and then 4.75 g NaOH (99%, solid) was added under stirring to obtain a solution. 14.62 g of powder of ZSM-5 zeolite having a $SiO_2/Al_2O_3$ mole ratio (SAR) of 28 (from China Catalyst Group Ltd. (CCG)) and 0.63 g of AFX powder (SAR 12.4) were added into the solution and stirred for 30 minutes. The obtained mixture was transferred into a 120 ml autoclave, and heated at 140° C. for 4 days under rotation. After cooling to room temperature and pressure release, the product was filtered, washed with DI water and dried at 120° C. The as-synthesized product was calcined in air in a furnace at 550° C. for 6 hours, obtaining a Na-form AFX zeolite having a SAR of 10.7 and a BET surface of 558 $m^2/g$. The Na-form AFX zeolite is present in form of spheroidal aggregate particles as observed from the SEM image shown in FIG. 1.

Figure 2:
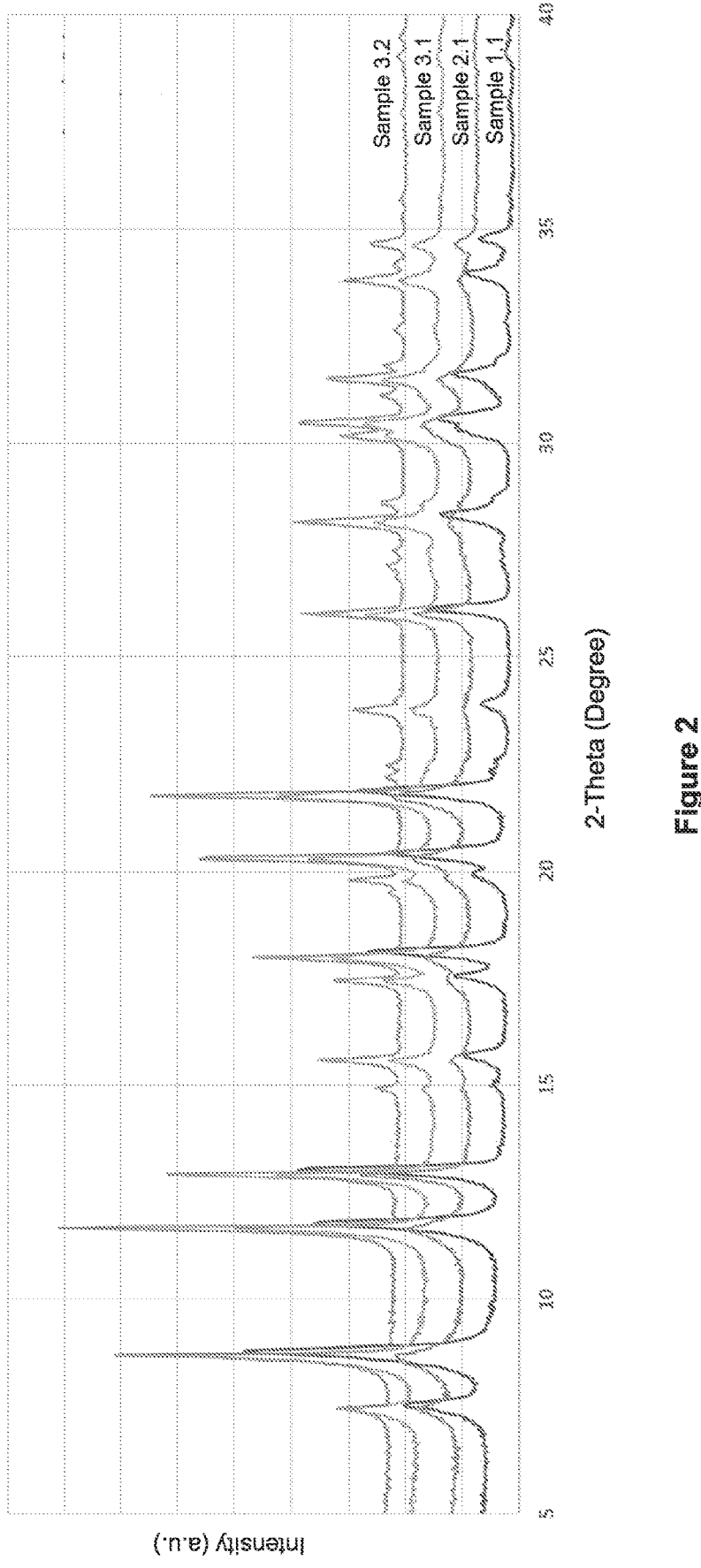
FIG. 2 shows XRD patterns of the AFX zeolite materials as prepared in Example 1.1, Example 2.1, Example 3.1 and Example 3.2.
Figure 3:
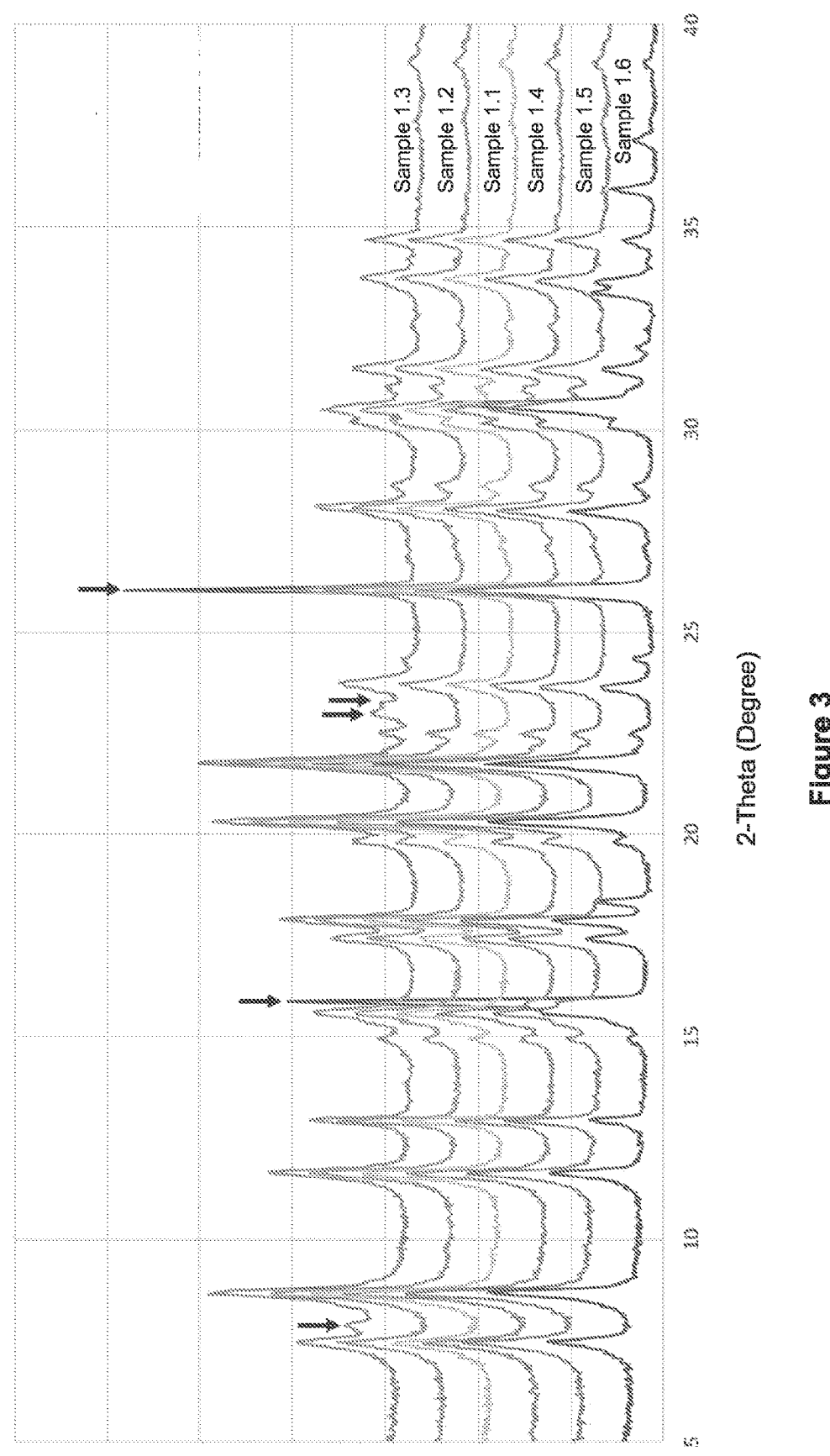
FIG. 3 shows XRD patterns of the zeolite materials as prepared from ZSM-5 zeolite at different $Na/SiO_2$ molar ratios according to Examples 1.1 to 1.6, wherein the peaks denoted by arrows belong to unconverted ZSM-5 framework in samples 1.3 and 1.6 respectively.

XRD analysis indicated that the as-synthesized product has an AFX framework structure as shown in FIGS. 2 and 3, a cell parameter of 13.667 Å, c cell parameter of 19.648 Å and cell volume of 3179 Å$^3$.

Example 1.2 (Sample 1.2, Na/SiO$_2$ 0.52)

The process of Example 1.1 was repeated except that 4.41 g NaOH (99% solid) was used.

Example 1.3 (Sample 1.3, Na/SiO$_2$ 0.48)

The process of Example 1.1 was repeated except that 4.07 g NaOH (99% solid) was used.

Example 1.4 (Sample 1.4, Na/SiO$_2$ 0.60)

The process of Example 1.1 was repeated except that 5.09 g NaOH (99% solid) was used.

Example 1.5 (Sample 1.5, Na/SiO$_2$ 0.64)

The process of Example 1.1 was repeated except that 5.43 g NaOH (99% solid) was used.

Example 1.6 (Sample 1.6, Na/SiO$_2$ 0.68)

The process of Example 1.1 was repeated except that 5.77 g NaOH (99% solid) was used.

Example 2

Preparation of AFX Zeolite using SSZ-13 Zeolite

Example 2.1 (Sample 2.1, Na/SiO$_2$ 0.58)

42.83 g of 18.03 wt % aqueous Et6-diquat-5 hydroxide solution was mixed with 39.69 g DI water, and then 4.92 g NaOH (99% solid) was added under stirring to obtain a solution. 14.19 g of powder of SSZ-13 zeolite having a $SiO_2/Al_2O_3$ mole ratio (SAR) of 30 (from China Catalyst Group Ltd. (CCG)) was added into the solution and stirred for 30 minutes. The obtained mixture was transferred into a 120 ml autoclave, and heated at 150° C. for 3 days under rotation. After cooling to room temperature and pressure release, the product was filtered, washed with DI water and dried at 120° C. The as-synthesized product was calcined in air in a furnace at 550° C. for 6 hours, obtaining a Na-form AFX zeolite having a SAR of 8.6 and a BET surface of 554 $m^2/g$. The Na-form AFX zeolite is present in form of spheroidal aggregate particles as observed from the SEM image shown in FIG. 1.

Figure 4:
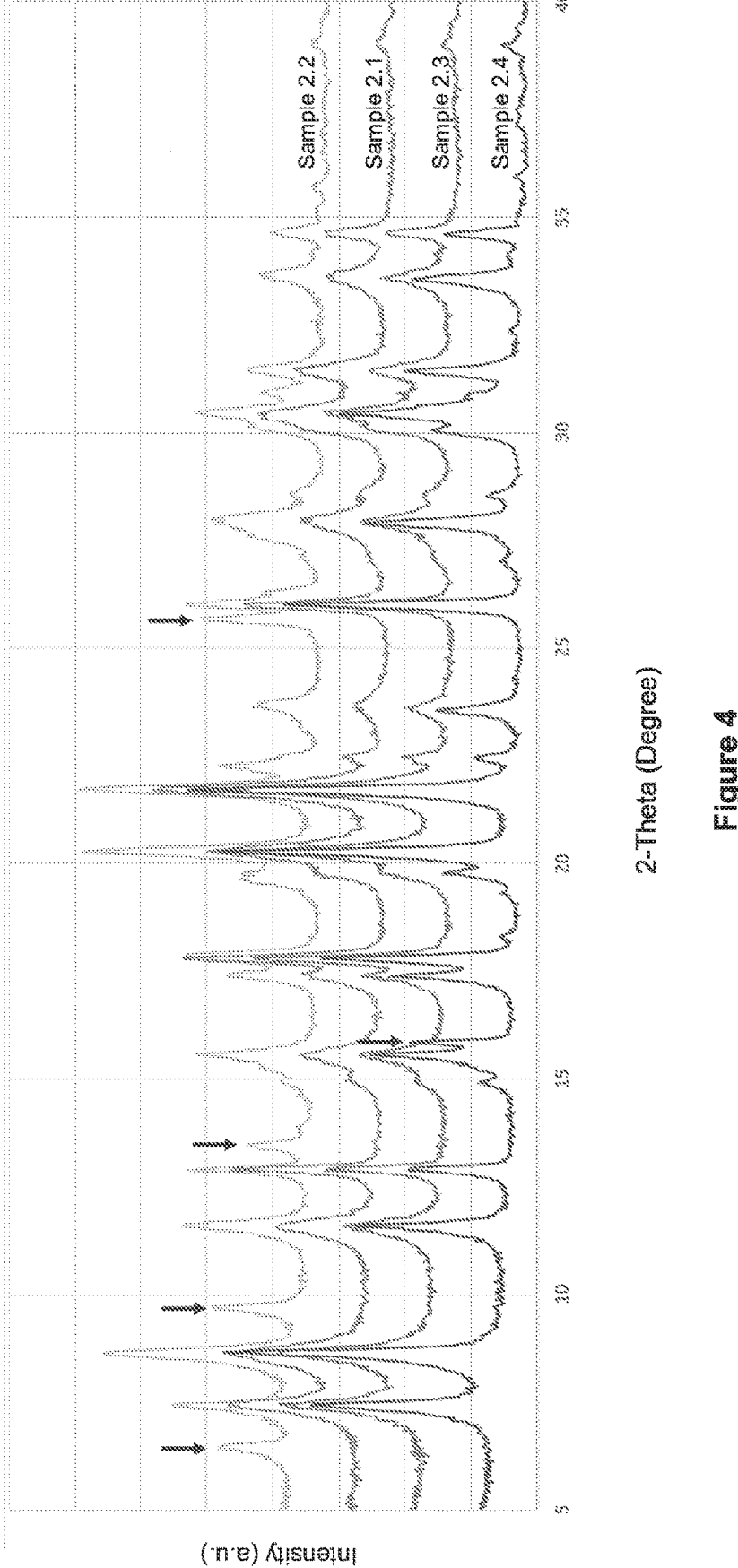
FIG. 4 shows XRD patterns of the zeolite materials as prepared from SSZ-13 zeolite at different $Na/SiO_2$ molar ratios according to Examples 2.1 to 2.4, wherein the peaks denoted by arrows belong to minor impurities in samples 2.2 and 2.4 respectively.
Figure 5:
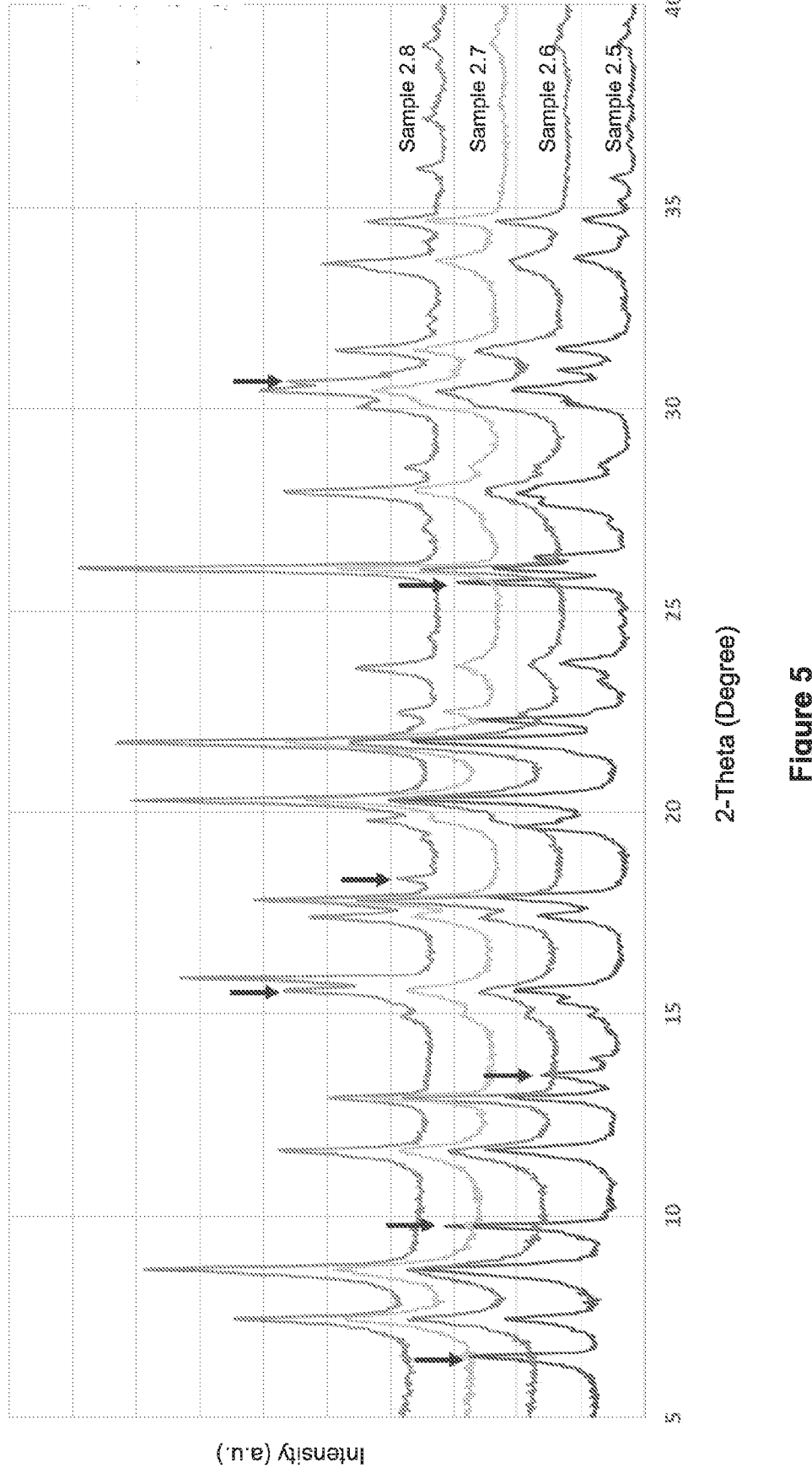
FIG. 5 shows XRD patterns of the zeolite materials as prepared from SSZ-13 zeolite at different $Na/SiO_2$ molar ratios according to Examples 2.5 to 2.8, wherein the peaks denoted by arrows belong to minor impurities in samples 2.5 and 2.8 respectively.

XRD analysis indicated that the as-synthesized product has an AFX framework structure as shown in FIGS. 2 and 4, a cell parameter of 13.672 Å, c cell parameter of 19.692 Å and cell volume of 3188 $Å^3$.

Example 2.2 (Sample 2.2, Na/SiO₂ 0.54)

The process of Example 2.1 was repeated except that 4.58 g NaOH (99% solid) was used.

Example 2.3 (Sample 2.3, Na/SiO₂ 0.62)

The process of Example 2.1 was repeated except that 5.26 g NaOH (99% solid) was used.

Example 2.4 (Sample 2.4, Na/SiO₂ 0.66)

The process of Example 2.1 was repeated except that 5.60 g NaOH (99% solid) was used.

Example 2.5 (Sample 2.5, Na/SiO₂ 0.54)

The process of Example 2.1 was repeated except that 4.58 g NaOH (99% solid) was added and the heating temperature is 160° C.

Example 2.6 (Sample 2.6, Na/SiO₂ 0.58)

The process of Example 2.1 was repeated except that 4.92 g NaOH (99% solid) was added and the heating temperature is 160° C.

Example 2.7 (Sample 2.7, Na/SiO₂ 0.62)

The process of Example 2.1 was repeated except that 5.26 g NaOH (99% solid) was added and the heating temperature is 160° C.

Example 2.8 (Sample 2.8, Na/SiO₂ 0.66)

The process of Example 2.1 was repeated except that 5.60 g NaOH (99% solid) was added and the heating temperature is 160° C.

Example 3

Preparation of AFX Zeolite using FAU Zeolite

Example 3.1 (Sample 3.1, Na/SiO₂ 0.68)

32.64 g of 18.03 wt % aqueous Et6-diquat-5 hydroxide solution was mixed with 74.93 g DI water, and then 6.59 g NaOH (99% solid) was added under stirring to obtain a solution. 16.16 g of powder of FAU zeolite having a $SiO_2/Al_2O_3$ mole ratio (SAR) of 36 (HY, from Pacific industrial Development Corporation (PIDC)) was added into the solution and stirred for 30 minutes. The obtained mixture was transferred into a 120 ml autoclave, and heated at 140° C. for 4 days under rotation. After cooling to room temperature and pressure release, the product was filtered, washed with DI water and dried at 120° C., The as-synthesized product was calcined in air in a furnace at 550° C. for 6 hours, obtaining a Na-form AFX zeolite having a SAR of 10.4 and a BET surface of 518 $m^2/g$. The Na-form AFX zeolite is present in form of spheroidal aggregate particles as observed from the SEM image shown in FIG. 1.

XRD analysis indicated that the as-synthesized product has an AFX framework structure as shown in FIG. 2, a cell parameter of 13.686 Å, c cell parameter of 19.686 Å and cell volume of 3193 $Å^3$.

Example 3.2 (Sample 3.2, Na/SiO₂ 0.76)

21.42 g of 18.03 wt % aqueous Et6-diquat-5 hydroxide solution was mixed with 72.84 g DI water, and then 6.45 g NaOH (99% solid) was added under stirring to obtain a solution. 2.78 g of powder of FAU zeolite having a $SiO_2/Al_2O_3$ mole ratio (SAR) of 5.2 (HY, from Shandong Duoyou) was added into the solution, to which 27.24 g colloidal silica (Ludox-AS-40) was added, and then stirred for 30 minutes. The obtained mixture was transferred into a 150 ml autoclave, and heated at 140° C. for 4 days under rotation. After cooling to room temperature and pressure release, the product was filtered, washed with DI water and dried at 120° C. The as-synthesized product was calcined in air in a furnace at 550° C. for 6 hours, obtaining a Na-form AFX zeolite having a SAR of 9.9 and a BET surface of 566 $m^2/g$. The Na-form AFX zeolite is present in form of spheroidal aggregate particles as observed from the SEM image shown in FIG. 1.

XRD analysis indicated that the as-synthesized product has an AFX framework structure as shown in FIG. 2, a cell parameter of 13.696 Å, c cell parameter of 19.798 Å and cell volume of 3216 $Å^3$.

Example 4

Preparation of Fe-Loaded AFX Zeolite

Example 4.1

The Na-form AFX zeolite powder from Example 1.1 upon crush was added into 10 wt % aqueous $NH_4Cl$ solution at a liquid to solid ratio of 10:1 by weight. The obtained slurry was heated to 80° C. and kept for 2 hours, and then filtered, washed and dried at 110° C. The ion-exchange procedure was repeated once and the dried product was calcined in air in a furnace at 450° C. for 6 hours, obtaining a H-form AFX zeolite.

The H-form AFX zeolite powder was impregnated with an aqueous iron(III) nitrate solution by incipient wetness impregnation, dried and calcined in air in a furnace at 450° C. for 5 hours, to obtain a Fe-loaded AFX zeolite with Fe loading of 0.40 moles per mole of framework aluminum.

Example 4.2

The process of Example 4.1 was repeated except that the Na-form AFX zeolite powder from Example 3.2 was used as the starting material.

Example 5

Catalytic Test Performed on Aged Catalysts

The test samples were prepared by slurrying the Fe-loaded AFX zeolites from Example 4 with an aqueous solution of Zr-acetate and then dried at ambient temperature in air under stirring, and then calcined at 550° C. to provide a product containing 5 wt % $ZrO_2$ as the binder based on the amount of the product. The obtained product was crushed and then the fraction of 250-500 microns was aged at 820° C. in a flow of 10 vol % steam/air for 16 hours.

The selective catalytic reduction (SCR) measurement was carried out in a fixed-bed reactor with loading of 120 mg of respective test sample together with corundum of the same sieve fraction as diluent to about 1 L bed volume, in accordance with following conditions:

Gas feed: 500 ppm NO, 500 ppm $NH_3$, 5% $H_2O$, 10% $O_2$ and balance of $N_2$, with gas hourly space velocity (GHSV) 80,000 h$^{-1}$;

Temperature: RUN1—200, 400, 575° C. (first run for degreening)

RUN2—175, 200, 225, 250, 500, 550, 575° C.

Results from RUN 2 at 250° C. and 575° C. are summarized in the Table 1.

TABLE 1

| Sample | $NO_x$ conversion (%) 250° C. | $NO_x$ conversion (%) 575° C. |
|---|---|---|
| Example 4.1 | 3.7 | 63.7 |
| Example 4.2 | 3.2 | 34.3 |

It can be seen from the results shown in Table 1, the conversion of NOx at 575° C. achieved with the zeolite catalyst prepared from ZSM-5 zeolite (non-FAU zeolite) is approximately 2 times higher than the conversion of NOx achieved with the zeolite catalyst prepared from FAU zeolite.

The invention claimed is:

1. A process for preparing a zeolite material having an AFX framework structure comprising $X_2O_3$ and $YO_2$ via interzeolite conversion, the process comprising (1) providing a mixture comprising a first zeolite material having a non-FAU framework structure comprising $X_2O_3$ and $YO_2$ and an organic structure directing agent selected from the group consisting of diquaternary ammonium cation containing compounds, wherein the first zeolite material acts as sources for $X_2O_3$ and $YO_2$, and (2) heating the mixture from (1) to form a second zeolite material having an AFX framework structure comprising $X_2O_3$ and $YO_2$, wherein X is a trivalent element and Y is a tetravalent element, and wherein when the first zeolite material is a zeolite having a CHA framework structure, the organic structure directing agent is not 1,4-bis(1,4-diazabicyclo[2.2.2]octane)butyl dihydroxide.

2. The process according to claim 1, wherein X is selected from the group consisting of Al, B, In and Ga and any combinations thereof.

3. The process according to claim 1, wherein Y is selected from the group consisting of Si, Sn, Ti, Zr, Ge and any combinations thereof.

4. The process according to claim 1, wherein the first zeolite material is a zeolite having a CHA framework structure or a zeolite having an MFI framework structure.

5. The process according to claim 1, wherein the first zeolite material is an aluminosilicate zeolite.

6. The process according to claim 1, wherein the organic structure directing agent is selected from the group consisting of the compounds containing a diquaternary ammonium cation of formula (I)

$$(R_1R_2R_3)N^+(CH_2)_nN^+(R_4R_5R_6) \qquad (I)$$

in which $R_1$, $R_2$, $R_3$, $R_4$, $R_5$ and $R_6$, independently from each other, are selected from the group consisting of $C_1$-$C_{10}$ alkyl, and n is an integer of 3 to 10, or in which one of $R_1$, $R_2$ and $R_3$ is selected from the group consisting of $C_1$-$C_{10}$ alkyl and the other two are linked together to form a $C_4$-$C_6$ alkylene, one of $R_4$, $R_5$ and $R_6$ is selected from the group consisting of $C_1$-$C_{10}$ alkyl and the other two are linked together to form a $C_4$-$C_6$ alkylene, and n is an integer of 3 to 10.

7. The process according to claim 1, wherein the organic structure directing agent is selected from the group consisting of the compounds containing a diquaternary ammonium cation of formula (I), $$(R_1R_2R_3)N^+(CH_2)_nN^+(R_4R_5R_6) \qquad (I)$$

in which $R_1$, $R_2$, $R_3$, $R_4$, $R_5$ and $R_6$, independently from each other, are selected from the group consisting of $C_1$-$C_6$ alkyl, and n is an integer of 4 to 7.

8. The process according to claim 1, wherein the organic structure directing agent is selected from the group consisting of the compounds containing a diquaternary ammonium cation of formula (I), $$(R_1R_2R_3)N^+(CH_2)_nN^+(R_4R_5R_6) \qquad (I)$$

in which $R_1$, $R_2$, $R_3$, $R_4$, $R_5$ and $R_6$ are the same and selected from the group consisting of $C_1$-$C_6$ alkyl, and n is 5, 6 or 7.

9. The process according to claim 1, wherein the organic structure directing agent is selected from the group consisting of the compounds containing a diquaternary ammonium cation of formula (I), $$(R_1R_2R_3)N^+(CH_2)_nN^+(R_4R_5R_6) \qquad (I)$$

in which each of $R_1$, $R_2$, $R_3$, $R_4$, $R_5$ and $R_6$ is methyl, ethyl or propyl, and n is 5, 6 or 7.

10. The process according to claim 1, wherein the organic structure directing agent is N,N,N,N',N',N'-hexaethyl-1,5-pentanediammonium.

11. The process according to claim 1, wherein the mixture in step (1) further comprises at least one source for alkali metal and/or alkaline earth metal cation.

12. The process according to claim 11, wherein the mixture provided in step (1) comprises at least one source for alkali metal and has an AM:$YO_2$ molar ratio of the at least one alkali metal to the source(s) for $YO_2$ calculated as $YO_2$ in the range of from 0.01 to 1.0.

13. The process according to claim 12, wherein the first zeolite material is a zeolite having an MFI framework structure, and the AM:$YO_2$ molar ratio of the at least one alkali metal to the source(s) for $YO_2$ calculated as $YO_2$ is in the range of 0.51 to 0.65.

14. The process according to claim 12, wherein the first zeolite material is zeolite having a CHA framework structure, and the AM:$YO_2$ molar ratio of the at least one alkali metal to the source(s) for $YO_2$ calculated as $YO_2$ is in the range of 0.56 to 0.64.

15. The process according to claim 1, further comprising (3) calcining the second zeolite material having an AFX framework structure.

16. The process according to claim 1, further comprising (4) exchanging one or more of ionic non-framework elements contained in the zeolite material obtained in step (2) or (3) to $H^+$ and/or $NH_4^+$.

17. The process according to claim 1, further comprising (5) loading a promoter metal cation on and/or in the zeolite material obtained in step (3) or (4).

18. A process for preparing a zeolite material having an AFX framework structure comprising $X_2O_3$ and $YO_2$ via interzeolite conversion, the process comprising (1) providing a mixture comprising a first zeolite material having a non-FAU framework structure comprising $X_2O_3$ and $YO_2$ and an organic structure directing agent selected from the group consisting of diquaternary ammonium cation containing compounds, wherein the first zeolite material acts as sources for $X_2O_3$ and $YO_2$, and (2) heating the mixture from (1) to form a second zeolite material having an AFX framework structure comprising $X_2O_3$ and $YO_2$, wherein X is a trivalent element and Y is a tetravalent element, wherein when the first zeolite material is a zeolite having a CHA framework structure, the organic structure directing agent is not 1,4-bis(1,4-diazabicyclo[2.2.2] octane)butyl dihydroxide, and wherein the organic structure directing agent is N,N,N,N',N',N'-hexaethyl-1,5-pentanediammonium.

19. A process for preparing a zeolite material having an AFX framework structure comprising $X_2O_3$ and $YO_2$ via interzeolite conversion, the process comprising (1) providing a mixture comprising a first zeolite material having a non-FAU framework structure comprising $X_2O_3$ and $YO_2$ and an organic structure directing agent selected from the group consisting of diquaternary ammonium cation containing compounds, wherein the first zeolite material acts as sources for $X_2O_3$ and $YO_2$, and (2) heating the mixture from (1) to form a second zeolite material having an AFX framework structure comprising $X_2O_3$ and $YO_2$, wherein X is a trivalent element and Y is a tetravalent element, and wherein the organic structure directing agent is N,N,N,N',N',N'-hexaethyl-1,5-pentanediammonium.

\* \* \* \* \*